US010538720B2

(12) United States Patent
Vasquez Valdivieso et al.

(10) Patent No.: US 10,538,720 B2
(45) Date of Patent: *Jan. 21, 2020

(54) PARTICLES INCLUDING ENZYME

(71) Applicant: The Procter & Gamble Company, Cincinnati, OH (US)

(72) Inventors: Montserrat Guadalupe Vasquez Valdivieso, Newcastle Upon Tyne (GB); Neil Joseph Lant, Newcastle Upon Tyne (GB)

(73) Assignee: The Procter & Gamble Company, Cincinnati, OH (US)

( * ) Notice: Subject to any disclaimer, the term of this patent is extended or adjusted under 35 U.S.C. 154(b) by 278 days.

This patent is subject to a terminal disclaimer.

(21) Appl. No.: 15/064,184

(22) Filed: Mar. 8, 2016

(65) Prior Publication Data
US 2017/0260481 A1 Sep. 14, 2017

(51) Int. Cl.
C11D 17/06 (2006.01)
C11D 3/386 (2006.01)
C11D 3/50 (2006.01)
C11D 11/00 (2006.01)
D06L 1/00 (2017.01)

(52) U.S. Cl.
CPC .............. C11D 3/386 (2013.01); C11D 3/505 (2013.01); C11D 17/06 (2013.01)

(58) Field of Classification Search
None
See application file for complete search history.

(56) References Cited

U.S. PATENT DOCUMENTS

| 3,749,671 | A | * | 7/1973 | Gedge, III | ................ | B01J 2/04 |
| | | | | | | 435/187 |
| 3,784,476 | A | | 1/1974 | Van | | |
| 4,090,973 | A | * | 5/1978 | Maguire, Jr. | ...... | C11D 3/38672 |
| | | | | | | 427/212 |
| 4,176,079 | A | | 11/1979 | Guerry et al. | | |
| 4,767,557 | A | | 8/1988 | Herdeman | | |
| 5,254,287 | A | | 10/1993 | Deleeuw | | |
| 5,423,997 | A | * | 6/1995 | Ahmed | .................... | C11D 3/08 |
| | | | | | | 510/226 |
| 5,707,951 | A | | 1/1998 | Masschelein et al. | | |
| 5,846,798 | A | | 12/1998 | Paatz | | |
| 6,380,140 | B1 | | 4/2002 | Paatz | | |
| 6,472,364 | B1 | | 10/2002 | Heltovics | | |
| 6,673,763 | B1 | | 1/2004 | Hansen et al. | | |
| 6,849,591 | B1 | * | 2/2005 | Boeckh | ................ | C11D 3/3761 |
| | | | | | | 510/101 |
| 7,049,274 | B2 | | 5/2006 | Ranade et al. | | |
| 7,704,940 | B2 | | 4/2010 | Boerefijn et al. | | |
| 7,867,968 | B1 | * | 1/2011 | Aouad | ..................... | C08K 7/22 |
| | | | | | | 510/296 |
| 8,476,219 | B2 | | 7/2013 | Aouad | | |
| 8,580,549 | B2 | | 11/2013 | Michels et al. | | |
| 8,580,720 | B2 | | 11/2013 | Boutique et al. | | |
| 8,716,208 | B2 | | 5/2014 | Meek et al. | | |
| 9,221,028 | B2 | | 12/2015 | Dihora et al. | | |
| 9,347,022 | B1 | * | 5/2016 | Frentzel | .................... | C11B 9/00 |
| 2002/0016276 | A1 | | 2/2002 | Spendel | | |
| 2003/0104969 | A1 | | 6/2003 | Caswell et al. | | |
| 2004/0229329 | A1 | | 11/2004 | Becker et al. | | |
| 2006/0073193 | A1 | | 4/2006 | Marcussen et al. | | |
| 2008/0014393 | A1 | | 1/2008 | Denome et al. | | |
| 2008/0242584 | A1 | | 10/2008 | Wahl et al. | | |
| 2009/0028912 | A1 | | 1/2009 | Dave | | |
| 2009/0156454 | A1 | | 6/2009 | Schmiedel | | |
| 2009/0163398 | A1 | | 6/2009 | Miyamoto | | |
| 2010/0256036 | A1 | * | 10/2010 | Benda | ....................... | C11D 1/40 |
| | | | | | | 510/299 |
| 2011/0021406 | A1 | * | 1/2011 | Lant | .......................... | C11D 3/10 |
| | | | | | | 510/302 |
| 2011/0212868 | A1 | * | 9/2011 | Lant | .......................... | C11D 3/06 |
| | | | | | | 510/299 |
| 2011/0212872 | A1 | | 9/2011 | Meek et al. | | |
| 2012/0175016 | A1 | * | 7/2012 | Lopez | ..................... | B65D 25/36 |
| | | | | | | 141/381 |
| 2012/0270765 | A1 | * | 10/2012 | Aouad | ................ | C11D 3/3707 |
| | | | | | | 512/4 |
| 2013/0040872 | A1 | | 2/2013 | Borup | | |
| 2013/0345108 | A1 | | 12/2013 | Lock | | |
| 2014/0179587 | A1 | | 6/2014 | Brown et al. | | |
| 2014/0230157 | A1 | | 8/2014 | Lant et al. | | |
| 2016/0075976 | A1 | | 3/2016 | Andersen et al. | | |
| 2016/0122693 | A1 | * | 5/2016 | Sodd | ........................ | C11D 3/50 |
| | | | | | | 512/4 |

FOREIGN PATENT DOCUMENTS

| EP | 1 239 029 | | 9/2002 |
| EP | 2 254 982 | | 10/2009 |
| EP | 1953216 | A4 | 11/2009 |
| EP | 2322595 | A1 | 5/2011 |
| GB | 1 368 599 | | 10/1974 |
| JP | H09501840 | A | 2/1997 |
| JP | 10279992 | | 10/1998 |
| JP | 2000508703 | A | 7/2000 |
| JP | 2001527127 | A | 12/2001 |
| JP | 2003000234 | A | 1/2003 |
| JP | 2007137973 | A | 6/2007 |
| JP | 2013509508 | A | 3/2013 |
| JP | 2013529072 | A | 7/2013 |
| JP | 2015518920 | A | 7/2015 |
| WO | WO 98/01544 | | 1/1998 |
| WO | WO 2001/07556 | A1 | 2/2001 |
| WO | WO2007122126 | A1 | 11/2007 |
| WO | WO2011056938 | A1 | 5/2011 |
| WO | WO 2011/141497 | A1 | 11/2011 |

(Continued)

OTHER PUBLICATIONS

All Office Actions for U.S. Appl. No. 15/064,171.
International Search Report for International Application Serial No. PCT/US2017/021318, dated Jul. 4, 2017, 17 pages.

Primary Examiner — Lorna M Douyon
(74) Attorney, Agent, or Firm — Gary J. Foose

(57) ABSTRACT

A composition including a plurality of particles. The particles include from about 40% to about 99% by weight of said particles of a carrier and from about 0.0001% to about 5% by weight of an enzyme. Each of the particles has a mass between about 1 mg to about 5000 mg.

10 Claims, 1 Drawing Sheet

Specification includes a Sequence Listing.

(56) References Cited

FOREIGN PATENT DOCUMENTS

| WO | WO 2013/167613 A1 | 11/2013 |
| WO | WO 2013/188344 A2 | 12/2013 |
| WO | WO2014006424 A1 | 1/2014 |
| WO | WO 2014/191170 A1 | 12/2014 |
| WO | WO 2015/135757 A1 | 9/2015 |
| WO | WO 2016/023685 A1 | 2/2016 |

* cited by examiner

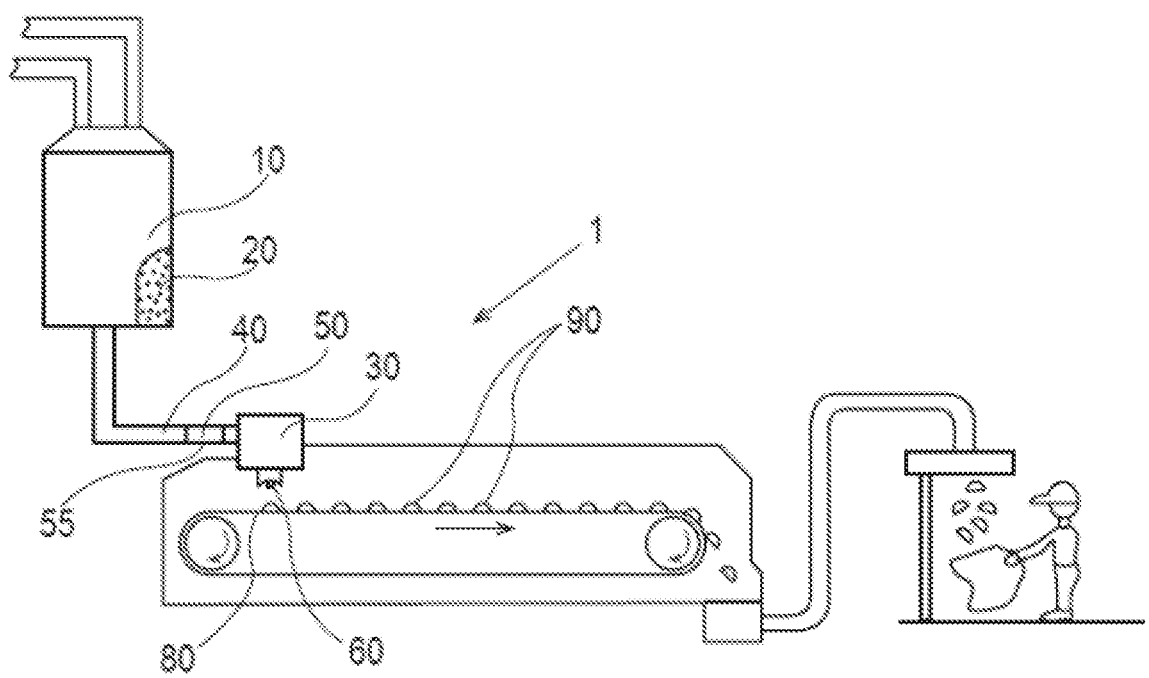

SEQUENCE LISTING

```
<160> NUMBER OF SEQ ID NOS: 6

<210> SEQ ID NO 1
<211> LENGTH: 109
<212> TYPE: PRT
<213> ORGANISM: Bacillus licheniformis

<400> SEQUENCE: 1

Ala Arg Tyr Asp Asp Val Leu Tyr Phe Pro Ala Ser Arg Tyr Pro Glu
1               5                   10                  15

Thr Gly Ala His Ile Ser Asp Ala Ile Lys Ala Gly His Ala Asp Val
            20                  25                  30

Cys Thr Ile Glu Arg Ser Gly Ala Asp Lys Arg Arg Gln Glu Ser Leu
        35                  40                  45

Lys Gly Ile Pro Thr Lys Pro Gly Phe Asp Arg Asp Glu Trp Pro Met
    50                  55                  60

Ala Met Cys Glu Glu Gly Gly Lys Gly Ala Ser Val Arg Tyr Val Ser
65                  70                  75                  80

Ser Ser Asp Asn Arg Gly Ala Gly Ser Trp Val Gly Asn Arg Leu Asn
                85                  90                  95

Gly Tyr Ala Asp Gly Thr Arg Ile Leu Phe Ile Val Gln
                100                 105
```

<210> SEQ ID NO 2
<211> LENGTH: 109
<212> TYPE: PRT
<213> ORGANISM: Bacillus subtilis

<400> SEQUENCE: 2

Ala Ser Ser Tyr Asp Lys Val Leu Tyr Phe Pro Leu Ser Arg Tyr Pro
1               5                   10                  15

Glu Thr Gly Ser His Ile Arg Asp Ala Ile Ala Glu Gly His Pro Asp
            20                  25                  30

Ile Cys Thr Ile Asp Asp Gly Ala Asp Lys Arg Arg Glu Glu Ser Leu
        35                  40                  45

Lys Gly Ile Pro Thr Lys Pro Gly Tyr Asp Arg Asp Glu Trp Pro Met
    50                  55                  60

Ala Val Cys Glu Glu Gly Gly Ala Gly Ala Asp Val Arg Tyr Val Thr
65                  70                  75                  80

Pro Ser Asp Asn Arg Gly Ala Gly Ser Trp Val Gly Asn Gln Met Ser
                85                  90                  95

Ser Tyr Pro Asp Gly Thr Arg Val Leu Phe Ile Val Gln
            100                 105

<210> SEQ ID NO 3
<211> LENGTH: 109
<212> TYPE: PRT
<213> ORGANISM: Bacillus licheniformis

<400> SEQUENCE: 3

Ala Arg Tyr Asp Asp Ile Leu Tyr Phe Pro Ala Ser Arg Tyr Pro Glu
1               5                   10                  15

Thr Gly Ala His Ile Ser Asp Ala Ile Lys Ala Gly His Ser Asp Val
            20                  25                  30

Cys Thr Ile Glu Arg Ser Gly Ala Asp Lys Arg Arg Gln Glu Ser Leu
        35                  40                  45

Lys Gly Ile Pro Thr Lys Pro Gly Phe Asp Arg Asp Glu Trp Pro Met
    50                  55                  60

Ala Met Cys Glu Glu Gly Gly Lys Gly Ala Ser Val Arg Tyr Val Ser
65                  70                  75                  80

Ser Ser Asp Asn Arg Gly Ala Gly Ser Trp Val Gly Asn Arg Leu Ser
                85                  90                  95

Gly Phe Ala Asp Gly Thr Arg Ile Leu Phe Ile Val Gln
            100                 105

<210> SEQ ID NO 4
<211> LENGTH: 361
<212> TYPE: PRT
<213> ORGANISM: Aggregatibacter actinomycetemcomitans

<400> SEQUENCE: 4

Asn Cys Cys Val Lys Gly Asn Ser Ile Tyr Pro Gln Lys Thr Ser Thr
1               5                   10                  15

Lys Gln Thr Gly Leu Met Leu Asp Ile Ala Arg His Phe Tyr Ser Pro
            20                  25                  30

Glu Val Ile Lys Ser Phe Ile Asp Thr Ile Ser Leu Gly Gly Asn
            35                  40                  45

Phe Leu His Leu His Phe Ser Asp His Glu Asn Tyr Ala Ile Glu Ser
        50                  55                  60

His Leu Leu Asn Gln Arg Ala Glu Asn Ala Val Gln Gly Lys Asp Gly

```
                65                  70                  75                  80
        Ile Tyr Ile Asn Pro Tyr Thr Gly Lys Pro Phe Leu Ser Tyr Arg Gln
                        85                  90                  95

Leu Asp Asp Ile Lys Ala Tyr Ala Lys Ala Lys Gly Ile Glu Leu Ile
                    100                 105                 110

Pro Glu Leu Asp Ser Pro Asn His Met Thr Ala Ile Phe Lys Leu Val
                    115                 120                 125

Gln Lys Asp Arg Gly Val Lys Tyr Leu Gln Gly Leu Lys Ser Arg Gln
                    130                 135                 140

Val Asp Glu Ile Asp Ile Thr Asn Ala Asp Ser Ile Thr Phe Met
        145                 150                 155                 160

Gln Ser Leu Met Ser Glu Val Ile Asp Ile Phe Gly Asp Thr Ser Gln
                        165                 170                 175

His Phe His Ile Gly Gly Asp Glu Phe Gly Tyr Ser Val Glu Ser Asn
                    180                 185                 190

His Glu Phe Ile Thr Tyr Ala Asn Lys Leu Ser Tyr Phe Leu Glu Lys
                    195                 200                 205

Lys Gly Leu Lys Thr Arg Met Trp Asn Asp Gly Leu Ile Lys Asn Thr
                    210                 215                 220

Phe Glu Gln Ile Asn Pro Asn Ile Glu Ile Thr Tyr Trp Ser Tyr Asp
        225                 230                 235                 240

Gly Asp Thr Gln Asp Lys Asn Glu Ala Ala Glu Arg Arg Asp Met Arg
                        245                 250                 255

Val Ser Leu Pro Glu Leu Leu Ala Lys Gly Phe Thr Val Leu Asn Tyr
                    260                 265                 270

Asn Ser Tyr Tyr Leu Tyr Ile Val Pro Lys Ala Ser Pro Thr Phe Ser
                    275                 280                 285

Gln Asp Ala Ala Phe Ala Ala Lys Asp Val Ile Lys Asn Trp Asp Leu
                    290                 295                 300

Gly Val Trp Asp Gly Arg Asn Thr Lys Asn Arg Val Gln Asn Thr His
        305                 310                 315                 320

Glu Ile Ala Gly Ala Ala Leu Ser Ile Trp Gly Glu Asp Ala Lys Ala
                        325                 330                 335

Leu Lys Asp Glu Thr Ile Gln Lys Asn Thr Lys Ser Leu Leu Glu Ala
                    340                 345                 350

Val Ile His Lys Thr Asn Gly Asp Glu
                    355                 360

<210> SEQ ID NO 5
<211> LENGTH: 204
<212> TYPE: PRT
<213> ORGANISM: Aspergillus oryzae

<400> SEQUENCE: 5

Lys Thr Gly Ser Gly Asp Ser Gln Ser Asp Pro Ile Lys Ala Asp Leu
        1                   5                   10                  15

Glu Val Lys Gly Gln Ser Ala Leu Pro Phe Asp Val Asp Cys Trp Ala
                        20                  25                  30

Ile Leu Cys Lys Gly Ala Pro Asn Val Leu Gln Arg Val Asn Glu Lys
                    35                  40                  45

Thr Lys Asn Ser Asn Arg Asp Arg Ser Gly Ala Asn Lys Gly Pro Phe
                    50                  55                  60

Lys Asp Pro Gln Lys Trp Gly Ile Lys Ala Leu Pro Pro Lys Asn Pro
        65                  70                  75                  80
```

```
Ser Trp Ser Ala Gln Asp Phe Lys Ser Pro Glu Glu Tyr Ala Phe Ala
                85                  90                  95

Ser Ser Leu Gln Gly Gly Thr Asn Ala Ile Leu Ala Pro Val Asn Leu
            100                 105                 110

Ala Ser Gln Asn Ser Gln Gly Gly Val Leu Asn Gly Phe Tyr Ser Ala
            115                 120                 125

Asn Lys Val Ala Gln Phe Asp Pro Ser Lys Pro Gln Gln Thr Lys Gly
            130                 135                 140

Thr Trp Phe Gln Ile Thr Lys Phe Thr Gly Ala Ala Gly Pro Tyr Cys
145                 150                 155                 160

Lys Ala Leu Gly Ser Asn Asp Lys Ser Val Cys Asp Lys Asn Lys Asn
                165                 170                 175

Ile Ala Gly Asp Trp Gly Phe Asp Pro Ala Lys Trp Ala Tyr Gln Tyr
                180                 185                 190

Asp Glu Lys Asn Asn Lys Phe Asn Tyr Val Gly Lys
                195                 200

<210> SEQ ID NO 6
<211> LENGTH: 188
<212> TYPE: PRT
<213> ORGANISM: Trichoderma harzianum

<400> SEQUENCE: 6

Ala Pro Ala Pro Met Pro Thr Pro Pro Gly Ile Pro Thr Glu Ser Ser
1               5                   10                  15

Ala Arg Thr Gln Leu Ala Gly Leu Thr Val Ala Val Ala Gly Ser Gly
            20                  25                  30

Thr Gly Tyr Ser Arg Asp Leu Phe Pro Thr Trp Asp Ala Ile Ser Gly
            35                  40                  45

Asn Cys Asn Ala Arg Glu Tyr Val Leu Lys Arg Asp Gly Glu Gly Val
            50                  55                  60

Gln Val Asn Asn Ala Cys Glu Ser Gln Ser Gly Thr Trp Ile Ser Pro
65                  70                  75                  80

Tyr Asp Asn Ala Ser Phe Thr Asn Ala Ser Ser Leu Asp Ile Asp His
                85                  90                  95

Met Val Pro Leu Lys Asn Ala Trp Ile Ser Gly Ala Ser Ser Trp Thr
                100                 105                 110

Thr Ala Gln Arg Glu Ala Leu Ala Asn Asp Val Ser Arg Pro Gln Leu
            115                 120                 125

Trp Ala Val Ser Ala Ser Ala Asn Arg Ser Lys Gly Asp Arg Ser Pro
130                 135                 140

Asp Gln Trp Lys Pro Pro Leu Thr Ser Phe Tyr Cys Thr Tyr Ala Lys
145                 150                 155                 160

Ser Trp Ile Asp Val Lys Ser Phe Tyr Lys Leu Thr Ile Thr Ser Ala
                165                 170                 175

Glu Lys Thr Ala Leu Ser Ser Met Leu Asp Thr Cys
            180                 185
```

PARTICLES INCLUDING ENZYME

FIELD OF THE INVENTION

Particulate laundry additive.

BACKGROUND OF THE INVENTION

Consumers of laundry detergents enjoy having the ability to customize the technologies they use in caring for their clothes and household fabrics. This is evidenced by the vast number of choices of cycles and variations to choose from on modern washing machines, the variety of pretreatment and wash additives, and the variety of laundry treatment compositions to choose from in the market place. Further, consumers also enjoy having the ability to customize the quantity of laundry treatment composition delivered to the wash.

Enzymes are a laundry treatment agent that can provide fantastic benefits to the consumer. Enzymes are widely known for raising the performance of primary and secondary detergency in laundry products. Enzymes can provide for stain removal, whiteness, color care, and fabric care. Typically, enzymes are provided as but a single component of a liquid or powder detergent composition. The level of enzyme can only be customized by the consumer by using more or less of the laundry treatment composition. So, to achieve customization of the enzyme level, the consumer also has to accept a corresponding increase or decrease in other benefit agents such as perfume, bleach, brightener, surfactant, softening agent, feel agent, and other benefit agents commonly provided in fully formulated laundry detergent products. The level of these other benefit agents may be increased or decreased to a degree that they are not pleasurable to experience or do not function.

Some enzymes commonly employed in detergent compositions are incompatible with one another. That is, the presence of a particular enzyme can decrease the activity of another enzyme. Different enzymes can perform different functions in a laundry detergent. For instance, one enzyme may be particularly efficacious at removing protein-based stains and another enzyme may be particularly efficacious at color restoration of fabrics by removal of pills. Providing laundry detergent compositions containing incompatible enzymes can be problematic.

Providing an enzyme as a stand-alone particulate product can be challenging because the particle sizes in which such enzyme is available are too small to be conveniently handled and small particles can undesirably become airborne. As such, providing enzymes in a formula or in a product that can be conveniently used by consumers to treat stains and restore color to fabrics is a challenge.

With these limitations in mind, there is a continuing unaddressed need for a particulate composition containing enzyme that provides consumers with the ability to conveniently control the amount of enzyme delivered to the wash.

SUMMARY OF THE INVENTION

A composition comprising a plurality of particles, wherein said particles comprise: from about 40% to about 99% by weight of said particles of a carrier; from about 0.0001% to about 5% by weight of said particles of an enzyme; and from about 0.1% to about 20% by weight perfume; wherein said plurality of particles has a mean particle mass between about 1 mg and about 5000 g; and wherein said plurality of particles has a standard deviation of mass less than about 30 mg.

A process for forming particles comprising the steps of: providing a precursor material; providing a distributor having a plurality of apertures; passing said precursor material through said apertures; providing a moving conveyor beneath said distributor; depositing said precursor material onto said moving conveyer; and cooling said precursor material to form a plurality of particles; wherein said precursor material comprises a water soluble polymer; from about 0.0001% to about 5% by weight of said precursor material of an enzyme; and from about 0.1% to about 20% by weight perfume; and wherein said precursor material is provided at a temperature less than about 70° C.

A process for treating laundry articles comprising the steps of: providing particles comprising: from about 40% to about 99% by weight of said particles of a carrier; from about 0.0001% to about 5% by weight of said particles an enzyme; and from about 0.1% to about 20% by weight perfume; placing a dose of said particles in a dosing cup; and dispensing said dose of said particles into a washing machine; wherein each of said particles has a mass between about 1 mg to about 5 grams.

BRIEF DESCRIPTION OF THE DRAWINGS

FIG. 1 is a apparatus for forming particles.

DETAILED DESCRIPTION OF THE INVENTION

Enzymes can provide multiple benefits when employed to wash textiles. Enzymes can provide for stain removal, color rejuvenation, and malodor treatment. Enzyme are available in liquid or solid form. Liquid forms of care enzymes can be conveniently formulated into liquid detergent compositions. Typically, liquid detergent compositions comprise multiple enzymes to help aid with removal of stains. Different staining materials are susceptible to being broken down by different enzymes. For instance, amylase can be efficacious for helping to remove starch-based stains. Fatty and oily stains can be removed more easily by applying lipase. Protease enzyme can help to remove protein-based stains. And cellulase enzyme can help to remove particulate soil, reduce graying of cottons, and reduce pilling.

Some enzymes can be incompatible with one another. For instance, protease enzyme can reduce the activity of some cellulase enzymes. As such, formulating liquid detergent compositions that include both protease and cellulase can be difficult. Similar compatibility problems can arise with solid forms of enzymes, even when the different enzymes are separated into different particles.

A further problem with solid forms of enzymes is that that the particles can become airborne during use. Airborne enzyme particles can be an environmental irritant.

Enzymes can be provided in particulate form as described herein. The particles can comprise about 40% to about 99% by weight of the particles a carrier and about 0.0001 to about 5% by weight of said particles of an enzyme. The particles disclosed herein can comprise an enzyme. The particles disclosed herein can comprise an enzyme selected from the group consisting of amylase, lipase, protease, cellulase, xyloglucanase, pectate lyase, peroxidases, mannanase, cutinases, and mixtures thereof. The particles can comprise about 0.001% to about 5% by weight of said particles of enzyme.

Optionally, for any of the compositions disclosed herein, individual particles can have a mass of from about 1 mg to about 5000 mg, alternatively from about 5 mg to about 1000 mg, alternatively from about 5 mg to about 200 mg, alternatively from about 10 mg to about 100 mg, alternatively from about 20 mg to about 50 mg, alternatively from about 35 mg to about 45 mg, alternatively about 38 mg, alternatively combinations thereof and any whole numbers or ranges of whole numbers of mg within any of the aforementioned ranges. Particles having a mass in the aforesaid ranges can have dissolution times in water that permit the particles to dissolve during a typical wash cycle. In a plurality of particles, individual particles can have a shape selected from the group consisting of spherical, hemispherical, compressed hemispherical, lentil shaped, and oblong.

The plurality of particles can have a mean particle mass of from about 1 mg to about 5000 mg, alternatively from about 5 mg to about 1000 mg, alternatively from about 5 mg to about 200 mg, alternatively from about 10 mg to about 100 mg, alternatively from about 20 mg to about 50 mg, alternatively from about 35 mg to about 45 mg, alternatively about 38 mg. The plurality of particles can have standard deviation of mass of less than about 30 mg, alternatively less than about 15 mg, alternatively less than about 5 mg, alternatively about 3 mg. The mean particle of mass within the aforesaid ranges can provide for a dissolution time in water that permits the particles to dissolve during a typical wash cycle. Without being bound by theory, it is thought that particles have such a standard deviation of mass can have a more uniform dissolution time in water as compared to particles having a broader standard deviation of mass. The smaller the standard deviation of mass of the particles the more uniform the dissolution time. The mass of the individual particles forming the plurality particles can be set to provide the desired dissolution time, which might be some fraction of the length of the typical washing cycle in a washing machine. Particles formed from polyethylene glycol having a weight average molecular weight of about 9000 can have mean particle mass of about 38 mg and standard deviation of mass of about 3 mg.

An individual particle may have a volume from about 0.003 $cm^3$ to about 5 $cm^3$. An individual particle may have a volume from about 0.003 $cm^3$ to about 1 $cm^3$. An individual particle may have a volume from about 0.003 $cm^3$ to about 0.5 $cm^3$. An individual particle may have a volume from about 0.003 $cm^3$ to about 0.2 $cm^3$. An individual particle may have a volume from about 0.003 $cm^3$ to about 0.15 $cm^3$. Smaller particles are thought to provide for better packing of the particles in a container and faster dissolution in the wash.

The composition can comprise particles that are retained on a number 10 sieve as specified by ASTM International, ASTM E11-13. The composition can comprise particles wherein more than about 50% by weight of the particles are retained on a number 10 sieve as specified by ASTM International, ASTM E11-13. The composition can comprise particles wherein more than about 70% by weight of the particles are retained on a number 10 sieve as specified by ASTM International, ASTM E11-13. The composition can comprise particles wherein more than about 90% by weight of the particles are retained on a number 10 sieve as specified by ASTM International, ASTM E11-13. It can be desirable to provide particles sized as such because particles retained on a number 10 sieve may be easier to handle than smaller particles.

The composition can comprise particles that are retained on a number 6 sieve as specified by ASTM International, ASTM E11-13. The composition can comprise particles wherein more than about 50% by weight of the particles are retained on a number 6 sieve as specified by ASTM International, ASTM E11-13. The composition can comprise particles wherein more than about 70% by weight of the particles are retained on a number 6 sieve as specified by ASTM International, ASTM E11-13. The composition can comprise particles wherein more than about 90% by weight of the particles are retained on a number 6 sieve as specified by ASTM International, ASTM E11-13. It can be desirable to provide particles sized as such because particles retained on a number 6 sieve may be easier to handle than smaller particles.

The composition can comprise particles that pass a sieve having a nominal sieve opening size of 22.6 mm. The composition can comprise particles that pass a sieve having a nominal sieve opening size of 22.6 mm and are retained on a sieve having a nominal sieve opening size of 0.841 mm Particles having a size such that they are retained on a sieve having a nominal opening size of 22.6 mm may tend to have a dissolution time that is too great for a common wash cycle. Particles having a size such that they pass a sieve having a nominal sieve opening size of 0.841 mm may be too small to conveniently handle. Particles having a size within the aforesaid bounds may represent an appropriate balance between dissolution time and ease of particle handling.

Particles having the size disclosed herein can be substantial enough so that they do not readily become airborne when poured from a container, dosing cup, or other apparatus, into a wash basin or washing machine. Further, such particles as disclosed herein can be easily and accurately poured from a container into a dosing cup. So such particles make it easy for the consumer to control the amount of enzyme she delivers to the wash.

A plurality of particles may collectively comprise a dose for dosing to a laundry washing machine or laundry wash basin. A single dose of the particles may comprise from about 1 g to about 27 g of particles. A single dose of the particles may comprise from about 5 g to about 27 g, alternatively from about 13 g to about 27 g, alternatively from about 14 g to about 20 g, alternatively from about 15 g to about 19 g, alternatively from about 18 g to about 19 g, alternatively combinations thereof and any whole numbers of grams or ranges of whole numbers of grams within any of the aforementioned ranges. The individual particles forming the plurality of particles that can make up the dose can have a mass from about 1 mg to about 5000 mg, alternatively from about 5 mg to about 1000 mg, alternatively from about 5 mg to about 200 mg, alternatively from about 10 mg to about 100 mg, alternatively from about 20 mg to about 50 mg, alternatively from about 35 mg to about 45 mg, alternatively about 38 mg, alternatively combinations thereof and any whole numbers or ranges of whole numbers of mg within any of the aforementioned ranges. The plurality of particles can be made up of particles having different size, shape, and/or mass. The particles in a dose can each have a maximum dimension less than about 15 mm Each of the particles in a dose can have a maximum dimension less than about 1 cm.

The particles disclosed herein can be conveniently employed to treat laundry articles. The steps of the process can be to provide such particles comprising the formulation components disclosed herein. A dose of the particles can be placed in a dosing cup. The dosing cup can be the closure of a container containing the particles. The dosing cup can be a detachable and attachable dosing cup that is detachable and attachable to a container containing the particles or to the closure of such container. The dose of particles in the dosing cup can be dispensed into a washing machine. The step of dispensing the particles in the washing machine can take place by pouring the particles into the washing machine or placing the dosing cup and the particles contained therein into the washing machine.

Carrier

The carrier can be or comprise a material selected from the group consisting of water soluble inorganic alkali metal salt, water-soluble alkaline earth metal salt, water-soluble organic alkali metal salt, water-soluble organic alkaline earth metal salt, water soluble carbohydrate, water-soluble silicate, water soluble urea, and any combination thereof. Alkali metal salts can be, for example, selected from the group consisting of salts of lithium, salts of sodium, and salts of potassium, and any combination thereof. Useful alkali metal salts can be, for example, selected from the group consisting of alkali metal fluorides, alkali metal chlorides, alkali metal bromides, alkali metal iodides, alkali metal sulfates, alkali metal bisulfates, alkali metal phosphates, alkali metal monohydrogen phosphates, alkali metal dihydrogen phosphates, alkali metal carbonates, alkali metal monohydrogen carbonates, alkali metal acetates, alkali metal citrates, alkali metal lactates, alkali metal pyruvates, alkali metal silicates, alkali metal ascorbates, and combinations thereof.

Alkali metal salts can be selected from the group consisting of, sodium fluoride, sodium chloride, sodium bromide, sodium iodide, sodium sulfate, sodium bisulfate, sodium phosphate, sodium monohydrogen phosphate, sodium dihydrogen phosphate, sodium carbonate, sodium hydrogen carbonate, sodium acetate, sodium citrate, sodium lactate, sodium tartrate, sodium silicate, sodium ascorbate, potassium fluoride, potassium chloride, potassium bromide, potassium iodide, potassium sulfate, potassium bisulfate, potassium phosphate, potassium monohydrogen phosphate, potassium dihydrogen phosphate, potassium carbonate, potassium monohydrogen carbonate, potassium acetate, potassium citrate, potassium lactate, potassium tartrate, potassium silicate, potassium, ascorbate, and combinations thereof. Alkaline earth metal salts can be selected from the group consisting of salts of magnesium, salts of calcium, and the like, and combinations thereof. Alkaline earth metal salts can be selected from the group consisting of alkaline metal fluorides, alkaline metal chlorides, alkaline metal bromides, alkaline metal iodides, alkaline metal sulfates, alkaline metal bisulfates, alkaline metal phosphates, alkaline metal monohydrogen phosphates, alkaline metal dihydrogen phosphates, alkaline metal carbonates, alkaline metal monohydrogen carbonates, alkaline metal acetates, alkaline metal citrates, alkaline metal lactates, alkaline metal pyruvates, alkaline metal silicates, alkaline metal ascorbates, and combinations thereof. Alkaline earth metal salts can be selected from the group consisting of magnesium fluoride, magnesium chloride, magnesium bromide, magnesium iodide, magnesium sulfate, magnesium phosphate, magnesium monohydrogen phosphate, magnesium dihydrogen phosphate, magnesium carbonate, magnesium monohydrogen carbonate, magnesium acetate, magnesium citrate, magnesium lactate, magnesium tartrate, magnesium silicate, magnesium ascorbate, calcium fluoride, calcium chloride, calcium bromide, calcium iodide, calcium sulfate, calcium phosphate, calcium monohydrogen phosphate, calcium dihydrogen phosphate, calcium carbonate, calcium monohydrogen carbonate, calcium acetate, calcium citrate, calcium lactate, calcium tartrate, calcium silicate, calcium ascorbate, and combinations thereof. Inorganic salts, such as inorganic alkali metal salts and inorganic alkaline earth metal salts, do not contain carbon. Organic salts, such as organic alkali metal salts and organic alkaline earth metal salts, contain carbon. The organic salt can be an alkali metal salt or an alkaline earth metal salt of sorbic acid (i.e., asorbate). Sorbates can be selected from the group consisting of sodium sorbate, potassium sorbate, magnesium sorbate, calcium sorbate, and combinations thereof.

The carrier can be or comprise a material selected from the group consisting of a water-soluble inorganic alkali metal salt, a water-soluble organic alkali metal salt, a water-soluble inorganic alkaline earth metal salt, a water-soluble organic alkaline earth metal salt, a water-soluble carbohydrate, a water-soluble silicate, a water-soluble urea, and combinations thereof. The carrier or water soluble-soluble carrier can be selected from the group consisting of sodium chloride, potassium chloride, calcium chloride, magnesium chloride, sodium sulfate, potassium sulfate, magnesium sulfate, sodium carbonate, potassium carbonate, sodium hydrogen carbonate, potassium hydrogen carbonate, sodium acetate, potassium acetate, sodium citrate, potassium citrate, sodium tartrate, potassium tartrate, potassium sodium tartrate, calcium lactate, water glass, sodium silicate, potassium silicate, dextrose, fructose, galactose, isoglucose, glucose, sucrose, raffinose, isomalt, xylitol, candy sugar, coarse sugar, and combinations thereof. In one embodiment, the carrier or water-soluble carrier can be sodium chloride. In one embodiment, the carrier or water-soluble carrier can be table salt.

The carrier can be or comprise a material selected from the group consisting of sodium bicarbonate, sodium sulfate, sodium carbonate, sodium formate, calcium formate, sodium chloride, sucrose, maltodextrin, corn syrup solids, corn starch, wheat starch, rice starch, potato starch, tapioca starch, clay, silicate, citric acid carboxymethyl cellulose, fatty acid, fatty alcohol, glyceryl diester of hydrogenated tallow, glycerol, and combinations thereof.

The carrier can be selected from the group consisting of water soluble organic alkali metal salt, water soluble inorganic alkaline earth metal salt, water soluble organic alkaline earth metal salt, water soluble carbohydrate, water soluble silicate, water soluble urea, starch, clay, water insoluble silicate, citric acid carboxymethyl cellulose, fatty acid, fatty alcohol, glyceryl diester of hydrogenated tallow, glycerol, polyethylene glycol, and combinations thereof.

The carrier can be selected from the group consisting of disaccharides, polysaccharides, silicates, zeolites, carbonates, sulfates, citrates, and combinations thereof.

Examples of water soluble polymers include but are not limited to polyvinyl alcohols (PVA), modified PVAs; polyvinyl pyrrolidone; PVA copolymers such as PVA/polyvinyl pyrrolidone and PVA/polyvinyl amine; partially hydrolyzed polyvinyl acetate; polyalkylene oxides such as polyethylene oxide; polyethylene glycols; acrylamide; acrylic acid; cellulose, alkyl cellulosics such as methyl cellulose, ethyl cellulose and propyl cellulose; cellulose ethers; cellulose esters; cellulose amides; polyvinyl acetates; polycarboxylic acids and salts; polyaminoacids or peptides; polyamides; polyacrylamide; copolymers of maleic/acrylic acids; polysaccharides including starch, modified starch; gelatin; alginates; xyloglucans, other hemicellulosic polysaccharides including xylan, glucuronoxylan, arabinoxylan, mannan, glucomannan and galactoglucomannan; and natural gums such as pectin, xanthan, and carrageenan, locus bean, arabic, tragacanth; and combinations thereof. In one embodiment the polymer comprises polyacrylates, especially sulfonated polyacrylates and water-soluble acrylate copolymers; and alkylhydroxy cellulosics such as methylcellulose, carboxymethylcellulose sodium, modified carboxy-methylcellulose, dextrin, ethylcellulose, propylcellulose, hydroxyethyl cellulose, hydroxypropyl methylcellulose, maltodextrin, polymethacrylates. In yet another embodiment the polymer comprises PVA; PVA copolymers; hydroxypropyl methyl cellulose (HPMC); and mixtures thereof.

The particles can comprise from about 40% by weight to about 99% by weight of the particles of the carrier. The particles can comprise from about 45% by weight to about 99% by weight of the particles of the carrier. The particles can comprise from about 45% by weight to about 92% by weight of the particles of the carrier. The particles can comprise from about 40% by weight to about 99% by weight of the particles of the carrier.

The carrier can be polyethylene glycol (PEG). PEG can be a convenient material to employ to make particles because it can be sufficiently water soluble to dissolve during a wash cycle when the particles are within the aforesaid range of mass. Further, PEG can be easily processed as melt. The melt temperature of PEG can vary as a function of molecular weight of the PEG. The melt temperature of PEG, depending on molecular weight and or distribution of molecular weight, can be low enough such that when the particles comprising PEG and care enzyme are formed from a melt that includes PEG and the care enzyme, the activity of the care enzyme remains high enough to be able to restore the color of textiles.

The particles can comprise more than about 40% by weight PEG having a weight average molecular weight from about 2000 to about 13000. PEG has a relatively low cost, may be formed into many different shapes and sizes, minimizes unencapsulated perfume diffusion, and dissolves well in water. PEG comes in various weight average molecular weights. A suitable weight average molecular weight range of PEG includes from about 2,000 to about 13,000, from about 4,000 to about 12,000, alternatively from about 5,000 to about 11,000, alternatively from about 6,000 to about 10,000, alternatively from about 7,000 to about 9,000, alternatively combinations thereof. PEG is available from BASF, for example PLURIOL E 8000.

The particles can comprise more than about 40% by weight of the particles of PEG. The particles can comprise more than about 50% by weight of the particles of PEG. The particles can comprise more than about 60% by weight of the particles of PEG. The particles may comprise from about 65% to about 99% by weight of the composition of PEG. The particles may comprise from about 40% to about 99% by weight of the composition of PEG. The particles may comprise from about 45% to about 99% by weight of the composition of PEG.

Alternatively, the particles can comprise from about 40% to less than about 90%, alternatively from about 45% to about 75%, alternatively from about 50% to about 70%, alternatively combinations thereof and any whole percentages or ranges of whole percentages within any of the aforementioned ranges, of PEG by weight of the particles.

The plurality of particles can be substantially free from particles having a mass less than about 10 mg. This can be practical for limiting the ability of the particles to become airborne.

Depending on the application, the particles can comprise from about 0.5% to about 5% by weight of the particles of a balancing agent selected from the group consisting of glycerin, polypropylene glycol, isopropyl myristate, dipropylene glycol, 1,2-propanediol, and PEG having a weight average molecular weight less than 2,000, and mixtures thereof. The balancing agent can be practical for providing particles having the same processing characteristics even though the particles have different formulations. For instance, two different scent variants of a product may have different levels of perfume. With use of a balancing agent, the PEG level can be the same in each scent variant and the formulas can be balanced with the balancing agent. This can make processing simpler in that the formulas for the scent variants will have the same level of PEG and may have similar processing characteristics.

The particles can comprise an antioxidant. The antioxidant can help to promote stability of the color and or odor of the particles over time between production and use. The particles can comprise between about 0.01% to about 1% by weight antioxidant. The particles can comprise between about 0.001% to about 2% by weight antioxidant. The particles can comprise between about 0.01% to about 0.1% by weight antioxidant. The antioxidant can be butylated hydroxytoluene.

Enzyme

The enzyme in the particles can be provided at a level of 0.0001% to about 5% by weight of the particles an enzyme selected from the group consisting of care enzyme, nuclease, and combinations thereof. The enzyme in the particles can be provided at a level of 0.0001% to about 5% by weight of the particles an enzyme selected from the group consisting of care enzyme, nuclease, and combinations thereof. The enzyme in the particles disclosed herein can be an enzyme selected from the group consisting amylase, lipase, protease, cellulase, xyloglucanase, pectate lyase, peroxidases, mannanase, cutinases, P-nitrobenzylesterases, nucleases, and mixtures thereof. The enzyme in the particles can be provided at a level of 0.0001% to about 5% by weight of the particles. The enzyme in the particles can be provided at a level of 0.001% to about 5% by weight of the particles. These enzymes when used in laundering processes, can provide for one or more of stain removal, fabric rejuvenation, and malodor remediation. The enzyme can be nuclease, which can reduce malodor associated with fabrics.

With respect to nucleases, providing such enzyme in a particle as disclosed herein can be practical in that time is required for the particle to dissolve in the wash and release appreciable amounts of enzyme into the wash solution. This delay in release time allows for the surfactant and other components in the wash solution to start removing soils, thereby leaving the nucleic acids unprotected. Once released in sufficient quantity, the nucleases can target such nucleic acids and break down stains comprising such nucleic acids.

The enzyme can be in liquid, solid, or other form. The enzyme can be substantially homogeneously mixed with the carrier. Substantially homogeneously mixed components need not be perfectly homogeneous. The degree of homogeneity can be that which can be provided by mixing processes used by those skilled in the art in commercial applications to make particles.

Contemplated herein are enzyme particulates carried by the carrier of the particles. Enzyme particulates have an enzyme carrier and enzyme dispersed in the enzyme carrier. The enzyme particulate can be substantially homogeneously mixed with the carrier. So, an enzyme particulate dispersed substantially uniformly within the carrier can be considered to be substantially homogeneously mixed. Specifically contemplated herein are particles that comprise a carrier and an enzyme particulate substantially homogeneously mixes with the carrier with the enzyme particulate comprising enzyme and an enzyme carrier.

The enzyme can be in liquid form in the form of droplets substantially homogeneously mixed the carrier. The liquid enzyme can be distributed or dispersed in the carrier.

Enzyme carriers can be selected from the group consisting of sodium sulphate, sucrose, starch, polyvinyl alcohol, cellulose, dextrin, polybranched polyamine, and mixtures thereof. Useful enzyme carriers can comprise sodium sulphate, sucrose, starch, and polyvinyl alcohol. Enzyme carrier can comprise cellulose, for example fibrous cellulose, dextrin, and sodium sulphate. Enzyme carrier can comprise polybranched polyamine.

Care enzymes can be practical to include in particles disclosed herein. Care enzymes are enzymes active at restoring color to fabrics by removing fuzz and pills from the surface of a textile. The care enzyme can be a cellulase. The care enzyme can be an enzyme of the glycoside hydrolase family Glycoside Hydrolase Family means any Glycoside Hydrolase Family (designated by number) of the Glycoside Hydrolase Family Classification system, based on amino acid similarities, being part of the Carbohydrate-Active Enzymes database (CAZy) developed by the Glycogenomics group at Architecture et Fonction des Macromolecules Biologiques, Unite Mixte de Recherches UMR6098, CNRS, Universite de Provence Universite de la Mediterranee.

The care enzyme can be an enzyme of the glycosyl hydrolase family 45. Glycoside Hydrolase Family 45 includes the inverting enzymes of endoglucanase (EC 3.2.1.4).

The care enzyme can be cellulase that is alkaline or neutral cellulase having a color care benefits. The care enzymes, as disclosed herein, can have a molecular weight of from about 17 kDa to about 30 kDa. The care enzyme can be, for example, the endoglucanases sold under the tradename Biotouch(R) NCD, DCC and DCL (AB Enzymes, Darmstadt, Germany) Other preferred commercially available cellulases include CELLUZYME, CAREZYME, and RENOZYME (Novozymes A S), CLAZINASE, PURADAX HA, PURADAX(R) EG-L, and PURADAx(R) HA (Genencor International Inc.), and KAC-500(B), KAC(R)-500(B) (Kao Corporation).

Other care enzymes that can provide for an anti-pilling appearance benefit include cutinase (cutin hydrolases—EC 3.1.1.74) and P-nitrobenzylesterases (carboxyl esterases—EC 3.1.1.1). Examples of cutinase can be found in EP2767582A1. Examples of P-nitrobenzylesterases can be found in WO2007017181 and WO2015135757.

The care enzyme, if provided, can be selected from the group consisting of glycoside hydrolase family 45, cutinase, and P-nitrobenzylesterase, and mixtures thereof.

The particles can comprise about 40% to about 99% by weight of the particles a carrier and about 0.0001% to about 5% by weight of the particles of a care enzyme. The particle can comprise from about 0.5% to less than 3% by weight of the particles of the care enzyme.

The particles can comprise about 40% to about 99% by weight of the particles a carrier and about 0.0001% to about 5% by weight of said particles of an enzyme. The particle can comprise from about 0.5% to less than 3% by weight of the particles of an enzyme.

The particles can comprise about 40% to about 99% by weight of the particles a carrier and about 0.0001% to about 5% by weight of said particles of an enzyme selected from the group consisting of care enzyme, nuclease, and combinations thereof. The particle can comprise from about 0.5% to less than 3% by weight of the particles of an enzyme selected from the group consisting of care enzyme, nuclease, and combinations thereof. The particle can comprise from about 0.5% to less than 3% by weight of the particles of an enzyme selected from the group consisting amylase, lipase, protease, cellulase, xyloglucanase, pectate lyase, peroxidases, mannanase, cutinases, P-nitrobenzylesterases, nucleases, and mixtures thereof.

For particle sizes having an individual mass described herein, this weight fraction of enzyme can provide for an effective amount of enzyme to rejuvenate the color of multiple articles of clothing when the plurality of particles collectively forming a dose for dosing to a laundry washing machine or wash basis is between about 1 g to about 27 g.

The nuclease enzyme is an enzyme capable of cleaving the phosphodiester bonds between the nucleotide sub-units of nucleic acids. The nuclease enzyme herein can be a deoxyribonuclease or ribonuclease enzyme or a functional fragment thereof. By functional fragment or part is meant the portion of the nuclease enzyme that catalyzes the cleavage of phosphodiester linkages in the DNA backbone and so is a region of said nuclease protein that retains catalytic activity. Thus it includes truncated, but functional versions, of the enzyme and/or variants and/or derivatives and/or homologues whose functionality is maintained.

The nuclease enzyme can be a deoxyribonuclease. The nuclease enzyme can be a deoxyribonuclease selected from the group consisting of any of the classes E.C. 3.1.21.x, where x=1, 2, 3, 4, 5, 6, 7, 8 or 9, E.C. 3.1.22.y where y=1, 2, 4 or 5, E.C. 3.1.30.z where z=1 or 2, E.C. 3.1.31.1 and mixtures thereof.

Nucleases in class E.C. 3.1.21.x cleave at the 3' hydroxyl to liberate 5' phosphomonoesters as follows:

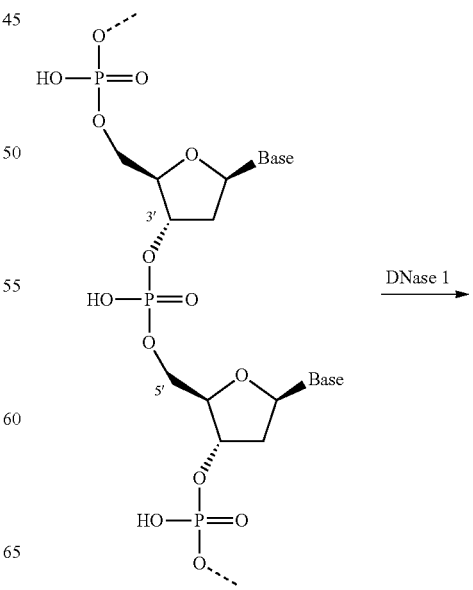

-continued

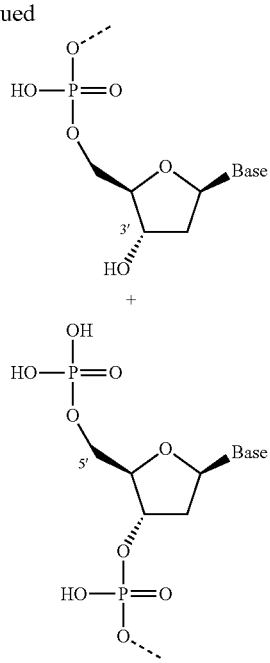

Nuclease enzymes from class E.C. 3.1.21.x and E.C. 3.1.21.x where x=1 can be practical.

Nucleases in class E.C. 3.1.22.y cleave at the 5' hydroxyl to liberate 3' phosphomonoesters. Enzymes in class E.C. 3.1.30.z can be practical as they act on both DNA and RNA and liberate 5'-phosphomonoesters. Suitable examples from class E.C. 3.1.31.2 are described in US2012/0135498A, such as SEQ ID NO:3 therein. Such enzymes are commercially available as DENARASE® enzyme from c-LECTA.

Nuclease enzymes from class E.C. 3.1.31.1 produce 3' phosphomonoesters.

The nuclease enzyme can comprise a microbial enzyme. The nuclease enzyme may be fungal or bacterial in origin. Bacterial nucleases can be practical. Fungal nucleases may practical as well.

The microbial nuclease is obtainable from *Bacillus*, such as a *Bacillus licheniformis* or *Bacillus subtilis* bacterial nucleases. A practical nuclease is obtainable from *Bacillus licheniformis*, preferably from strain EI-34-6. A practical deoxyribonuclease is a variant of *Bacillus licheniformis*, from strain EI-34-6 nucB deoxyribonuclease defined in SEQ ID NO:1 herein, or variant thereof, for example having at least 70% or 75% or 80% or 85% or 90% or 95%, 96%, 97%, 98%, 99% or 100% identical thereto.

Other suitable nucleases include those defined in SEQ ID NO:2 herein, or variant thereof, for example having at least 70% or 75% or 80% or 85% or 90% or 95%, 96%, 97%, 98%, 99% or 100% identical thereto. Other suitable nucleases include those defined in SEQ ID NO:3 herein, or variant thereof, for example having at least 70% or 75% or 80% or 85% or 90% or 95%, 96%, 97%, 98%, 99% or 100% identical thereto.

A fungal nuclease is obtainable from *Aspergillus*, for example *Aspergillus oryzae*. A preferred nuclease is obtainable from *Aspergillus oryzae* defined in SEQ ID NO: 5 herein, or variant thereof, for example having at least 60% or 70% or 75% or 80% or 85% or 90% or 95%, 96%, 97%, 98%, 99% or 100% identical thereto.

Another suitable fungal nuclease is obtainable from *Trichoderma*, for example *Trichoderma harzianum*. A practical nuclease can be obtained from *Trichoderma harzianum* defined in SEQ ID NO: 6 herein, or variant thereof, for example having at least 60% or 70% or 75% or 80% or 85% or 90% or 95%, 96%, 97%, 98%, 99% or 100% identical thereto.

Other fungal nucleases include those encoded by the DNA sequences of *Aspergillus oryzae* RIB40, *Aspergillus oryzae* 3.042, *Aspergillus flavus* NRRL3357, *Aspergillus parasiticus* SU-1, *Aspergillus nomius* NRRL13137, *Trichoderma reesei* QM6a, *Trichoderma vixens* Gv29-8, *Oidiodendron maius* Zn, *Metarhizium guizhouense* ARSEF 977, *Metarhizium majus* ARSEF 297, *Metarhizium robertsii* ARSEF 23, *Metarhizium acridum* CQMa 102, *Metarhizium brunneum* ARSEF 3297, *Metarhizium anisopliae*, *Colletotrichum fioriniae* PJ7, *Colletotrichum sublineola*, *Trichoderma atroviride* IMI 206040, *Tolypocladium ophioglossoides* CBS 100239, *Beauveria bassiana* ARSEF 2860, *Colletotrichum higginsianum*, *Hirsutella minnesotensis* 3608, *Scedosporium apiospermum*, *Phaeomoniella chlamydospora*, *Fusarium verticillioides* 7600, *Fusarium oxysporum* f. sp. cubense race 4, *Colletotrichum graminicola* M1.001, *Fusarium oxysporum* FOSC 3-a, *Fusarium avenaceum*, *Fusarium langsethiae*, *Grosmannia clavigera* kw1407, *Claviceps purpurea* 20.1, *Verticillium longisporum*, *Fusarium oxysporum* f. sp. cubense race 1, *Magnaporthe oryzae* 70-15, *Beauveria bassiana* D1-5, *Fusarium pseudograminearum* CS3096, *Neonectria ditissima*, *Magnaporthiopsis poae* ATCC 64411, *Cordyceps militaris* CM01, *Marssonina brunnea* f. sp. 'multigermtubi' MB_m1, *Diaporthe ampelina*, *Metarhizium album* ARSEF 1941, *Colletotrichum gloeosporioides* Nara gc5, *Madurella mycetomatis*, *Metarhizium brunneum* ARSEF 3297, *Verticillium alfalfae* VaMs.102, *Gaeumannomyces graminis* var. tritici R3-111a-1, *Nectria haematococca* mpVI 77-13-4, *Verticillium longisporum*, *Verticillium dahliae* VdLs.17, *Torrubiella hemipterigena*, *Verticillium longisporum*, *Verticillium dahliae* VdLs.17, *Botrytis cinerea* B05.10, *Chaetomium globosum* CBS 148.51, *Metarhizium anisopliae*, *Stemphylium lycopersici*, *Sclerotinia borealis* F-4157, *Metarhizium robertsii* ARSEF 23, *Myceliophthora thermophila* ATCC 42464, *Phaeosphaeria nodorum* SN15, *Phialophora attae*, *Ustilaginoidea virens*, *Diplodia seriata*, *Ophiostoma piceae* UAMH 11346, *Pseudogymnoascus pannorum* VKM F-4515 (FW-2607), *Bipolaris oryzae* ATCC 44560, *Metarhizium guizhouense* ARSEF 977, *Chaetomium thermophilum* var. *thermophilum* DSM 1495, *Pestalotiopsis fici* W106-1, *Bipolaris zeicola* 26-R-13, *Setosphaeria turcica* Et28A, *Arthroderma otae* CBS 113480 and *Pyrenophora tritici*-repentis Pt-1C-BFP.

The nuclease can be an isolated nuclease.

The nuclease enzyme can be present in a the laundering aqueous solution in an amount of from about 0.01 ppm to about 1000 ppm of the nuclease enzyme, or from about 0.05 or from about 0.1 ppm to about 750 or about 500 ppm.

The nucleases may also give rise to biofilm-disrupting effects.

The composition can additionally comprises a β-N-acetylglucosaminidase enzyme from E.C. 3.2.1.52, preferably an enzyme having at least 70%, or at least 75% or at least 80% or at least 85% or at least 90% or at least 95% or at least 96% or at least 97% or at least 98% or at least 99% or at least or 100% identity to SEQ ID NO:4.

Dye

The particles may comprise dye. The dye may include those dyes that are typically used in laundry detergent or fabric softeners. The fabric treatment composition may comprise less than about 0.1%, alternatively about 0.001% to about 0.1%, alternatively about 0.01% to about 0.02%, alternatively combinations thereof and any hundredths of percent or ranges of hundredths of percent within any of the aforementioned ranges, of dye by weight of the particles of fabric treatment composition. Examples of suitable dyes include, but are not limited to, LIQUITINT PINK AM, AQUA AS CYAN 15, and VIOLET FL, available from Milliken Chemical. Employing a dye can be practical to help the user differentiate between particles having differing scents.

Perfume

In addition to the carrier, the particles can further comprise 0.1% to about 20% by weight perfume. The perfume can be unencapsulated perfume, encapsulated perfume, perfume provided by a perfume delivery technology, or a perfume provided in some other manner Perfumes are generally described in U.S. Pat. No. 7,186,680 at column 10, line 56, to column 25, line 22. The particles can comprise unencapsulated perfume and are essentially free of perfume carriers, such as a perfume microcapsules. The particles can comprise perfume carrier materials (and perfume contained therein). Examples of perfume carrier materials are described in U.S. Pat. No. 7,186,680, column 25, line 23, to column 31, line 7. Specific examples of perfume carrier materials may include cyclodextrin and zeolites.

The particles can comprise about 0.1% to about 20%, alternatively about 1% to about 15%, alternatively 2% to about 10%, alternatively combinations thereof and any whole percentages within any of the aforementioned ranges, of perfume by weight of the particles. The particles can comprise from about 0.1% by weight to about 6% by weight of the particles of perfume. The perfume can be unencapsulated perfume and or encapsulated perfume.

The particles can be free or substantially free of a perfume carrier. The particles may comprise about 0.1% to about 20%, alternatively about 1% to about 15%, alternatively 2% to about 10%, alternatively combinations thereof and any whole percentages within any of the aforementioned ranges, of unencapsulated perfume by weight of the particles.

The particles can comprise unencapsulated perfume and perfume microcapsules. The particles may comprise about 0.1% to about 20%, alternatively about 1% to about 15%, alternatively from about 2% to about 10%, alternatively combinations thereof and any whole percentages or ranges of whole percentages within any of the aforementioned ranges, of the unencapsulated perfume by weight of the particles. Such levels of unencapsulated perfume can be appropriate for any of the particles disclosed herein that have unencapsulated perfume.

The particles can comprise unencapsulated perfume and a perfume microcapsule but be free or essentially free of other perfume carriers. The particles can comprise unencapsulated perfume and perfume microcapsules and be free of other perfume carriers.

The particles can comprise encapsulated perfume. Encapsulated perfume can be provided as plurality of perfume microcapsules. A perfume microcapsule is perfume oil enclosed within a shell. The shell can have an average shell thickness less than the maximum dimension of the perfume core. The perfume microcapsules can be friable perfume microcapsules. The perfume microcapsules can be moisture activated perfume microcapsules.

The perfume microcapsules can comprise a melamine/formaldehyde shell. Perfume microcapsules may be obtained from Appleton, Quest International, or International Flavor & Fragrances, or other suitable source. The perfume microcapsule shell can be coated with polymer to enhance the ability of the perfume microcapsule to adhere to fabric. This can be desirable if the particles are designed to be a fabric treatment composition. The perfume microcapsules can be those described in U.S. Patent Pub. 2008/0305982.

The particles can comprise about 0.1% to about 20%, alternatively about 0.1% to about 10%, alternatively about 1% to about 15%, alternatively 2% to about 10%, alternatively combinations thereof and any whole percentages within any of the aforementioned ranges, of encapsulated perfume by weight of the particles.

The particles can comprise perfume microcapsules but be free of or essentially free of unencapsulated perfume. The particles may comprise about 0.1% to about 20%, alternatively about 1% to about 15%, alternatively about 2% to about 10%, alternatively combinations thereof and any whole percentages within any of the aforementioned ranges, of encapsulated perfume by weight of the particles.

Method of Making Particles

An apparatus 1 for forming particles is shown in FIG. 1. The raw material or raw materials are provided to a mixer 10. The mixer 10 has sufficient capacity to retain the volume of raw materials provided thereto for a sufficient residence time to permit the desired level of mixing and or reaction of the raw materials. The material leaving the mixer 10 is the precursor material 20. The precursor material 20 can be a molten product. The mixer 10 can be a dynamic mixer. A dynamic mixer is a mixer to which energy is applied to mix the contents in the mixer. The mixer 10 can comprise one or more impellers to mix the contents in the mixer 10.

Between the mixer 10 and the distributor 30, the precursor material 20 can be transported through the feed pipe 40. The feed pipe 40 can be in fluid communication with the mixer 10. An intermediate mixer 55 can be provided in fluid communication with the feed pipe 40 between the mixer 10 and the distributor 30. The intermediate mixer 55 can be a static mixer 50 in fluid communication with the feed pipe 40 between the mixer 10 and the distributor 30. The intermediate mixer 55, which can be a static mixer 50, can be downstream of the mixer 10. Stated otherwise, the mixer 10 can be upstream of the intermediate mixer 55 or static mixer 55 if employed. The intermediate mixer 55 can be a static mixer 50. The intermediate mixer 55 can be a rotor-stator mixer. The intermediate mixer 55 can be a colloid mill. The intermediate mixer 55 can be a driven in-line fluid disperser. The intermediate mixer 55 can be an Ultra Turrax disperser, Dispax-reactor disperser, Colloid Mil MK, or Cone Mill MKO, available from IKA, Wilmington, N.C., United States of America. The intermediate mixer 55 can be a perforated disc mill, toothed colloid mill, or DIL Inline Homogenizer, available from FrymaKoruma, Rheinfelden, Switzerland.

The distributor 30 can be provided with a plurality of apertures 60. The precursor material 20 can be passed through the apertures 60. After passing through the apertures 60, the precursor material 20 can be deposited on a moving conveyor 80 that is provided beneath the distributor 30. The conveyor 80 can be moveable in translation relative to the distributor 30.

The precursor material 20 can be cooled on the moving conveyor 80 to form a plurality of solid particles 90. The cooling can be provided by ambient cooling. Optionally the cooling can be provided by spraying the under-side of the conveyor 80 with ambient temperature water or chilled water.

Once the particles 90 are sufficiently coherent, the particles 90 can be transferred from the conveyor 80 to processing equipment downstream of the conveyor 80 for further processing and or packaging.

Particles comprising a carrier that is a water soluble polymer can be made, by way of non-limiting example, by forming particles from a melt of the composition that ultimately forms the particles. The rotoforming process can be practical to make particles comprising polyethylene glycol as the carrier material. Other process for forming particles can be suitable as well.

The process for forming particles can comprise the step of providing a precursor material. The precursor material can be a melt of the composition that ultimately forms the particles. The precursor material can be passed through apertures in a distributor that is provided. The distributor can have a plurality of apertures. A moving conveyor can be provided beneath the distributor. The precursor material can be deposited on the moving conveyor. The deposited precursor material can be cooled to form the plurality of particles. The cooling can be ambient cooling or cooling in which heat is removed from the deposited precursor material to form the plurality of particles.

To help preserve the activity of the enzyme, it can be desirable to provide the precursor material at as low a temperature as possible that permits suitable particles to be formed. The precursor material can be provided at a temperature less than about 70° C. The precursor material can be provided at a temperature between the melt point of the precursor material and about 70° C.

Rotoforming can be a practical process for forming particles from a melt. One suitable rotoforming device is a Sandvik ROTOFORM 3000 having a 750 mm wide 10 m long belt. The distributor of a rotoforming device is a rotating cylinder. The cylinder can have 2 mm diameter apertures set at a 10 mm pitch in the cross machine direction and 9.35 mm pitch in the machine direction. The cylinder can be set at approximately 3 mm above the belt. The belt speed and rotational speed of the cylinder can be set at about 10 m/min.

The precursor material can be provided from a mixer. The precursor material can be pumped from the mixer through a plate and frame heat exchanger set to control the outlet temperature.

The precursor material can be prepared in a batch or continuous mixer. Molten carrier material can be provided and the other constituents of the particle can be mixed with the molten carrier.

Particles can also be made using other approaches. For instance, granulation or press agglomeration can be appropriate. In granulation, the precursor material is compacted and homogenized by rotating mixing tools and granulated to form particles. For precursor materials that are substantially free of water, a wide variety of sizes of particles can be made.

In press agglomeration, the precursor material is compacted and plasticized under pressure and under the effect of shear forces, homogenized and then discharged from the press agglomeration machine via a forming/shaping process. Press agglomeration techniques include extrusion, roller compacting, pelleting, and tableting.

The precursor material can be delivered to a planetary roll extruder or twin screw extruder having co-rotating or contra-rotating screws. The barrel and the extrusion granulation head can be heated to the desired extrusion temperature. The precursor material can be compacted under pressure, plasticized, extruded in the form of strands through a multiple-bore extrusion die in the extruder head, and sized using a cutting blade. The bore diameter of the of extrusion header can be selected to provide for appropriately sized particles. The extruded particles can be shaped using a spheronizer to provide for particles that have a spherical shape.

Optionally, the extrusion and compression steps may be carried out in a low-pressure extruder, such as a flat die pelleting press, for example as available from Amandus Kahl, Reinbek, Germany. Optionally, the extrusion and compression steps may be carried out in a low pressure extruder, such as a BEXTRUDER, available from Hosokawa Alpine Aktiengesellschaft, Augsburg, Germany.

The particles can be made using roller compacting. In roller compacting the precursor material is introduced between two rollers and rolled under pressure between the two rollers to form a sheet of compactate. The rollers provide a high linear pressure on the precursor material. The rollers can be heated or cooled as desired, depending on the processing characteristics of the precursor material. The sheet of compactate is broken up into small pieces by cutting. The small pieces can be further shaped, for example by using a spheronizer.

Examples/Combinations

A. A composition comprising a plurality of particles, wherein said particles comprise:
 from about 40% to about 99% by weight of said particles of a carrier;
 from about 0.0001% to about 5% by weight of said particles of an enzyme; and
 from about 0.1% to about 20% by weight perfume;
 wherein said plurality of particles has a mean particle mass between about 1 mg and about 5000 g; and
 wherein said plurality of particles has a standard deviation of mass less than about 30 mg.

B. The composition according to Paragraph A, wherein said carrier is a water soluble polymer.

C. The composition according to Paragraph A or B, wherein said particles comprise from more than 45% to about 99% by weight of said particles of said carrier.

D. The composition according to any one of Paragraphs A to C, wherein each of said particles has a mass between about 5 mg and about 200 mg.

E. The composition according to any one of Paragraphs A to D, wherein said carrier and said enzyme are substantially homogeneously mixed with one another.

F. The composition according to any one of Paragraphs A to E, wherein said enzyme is an enzyme particulate.

G. The composition according to any one of Paragraphs A to F, wherein said particles comprise from about 0.5% to less than 3% by weight of said particles of said enzyme.

H. The composition according to any one of Paragraphs A to G, wherein said carrier is polyethylene glycol, wherein said polyethylene glycol has a weight average molecular weight from about 2000 to about 13000.

I. The composition according to any one of Paragraphs A to H, wherein said particles comprise from about 0.1% to about 10% by weight encapsulated perfume.

J. The composition according to any one of Paragraphs A to I, wherein said carrier is selected from the group consisting of sucrose, sucrose bentonite, water soluble organic alkali metal salt, water soluble inorganic alkaline earth metal salt, water soluble organic alkaline earth metal salt, water soluble carbohydrate, water soluble silicate, water soluble urea, starch, clay, water insoluble silicate, citric acid carboxymethyl cellulose, fatty acid, fatty alcohol, glyceryl diester of hydrogenated tallow, glycerol, polyethylene glycol, and combinations thereof.

K. The composition according to any one of Paragraphs A to J, wherein said plurality of particles is substantially free from particles having a mass less than about 10 mg.
L. A process for forming particles comprising the steps of:
   providing a precursor material;
   providing a distributor having a plurality of apertures;
   passing said precursor material through said apertures;
   providing a moving conveyor beneath said distributor;
   depositing said precursor material onto said moving conveyer; and
   cooling said precursor material to form a plurality of particles;
   wherein said precursor material comprises a water soluble polymer; from about 0.0001% to about 5% by weight of said precursor material of an enzyme; and from about 0.1% to about 20% by weight perfume; and
   wherein said precursor material is provided at a temperature less than about 70° C.
M. The process according to Paragraph L, wherein said precursor material is polyethylene glycol, wherein said polyethylene glycol has a weight average molecular weight from about 2000 to about 13000.
N. A process for treating laundry articles comprising the steps of:
   providing particles comprising:
   from about 40% to about 99% by weight of said particles of a carrier;
   from about 0.0001% to about 5% by weight of said particles an enzyme; and
   from about 0.1% to about 20% by weight perfume;
   placing a dose of said particles in a dosing cup; and
   dispensing said dose of said particles into a washing machine;
   wherein each of said particles has a mass between about 1 mg to about 5 grams.
O. The process according to Paragraph N, wherein said carrier is a water soluble polymer.
P. The process according to Paragraph N or O, wherein said carrier is polyethylene glycol, wherein said polyethylene glycol has a weight average molecular weight from about 2000 to about 13000.
Q. The process according to any one of Paragraphs N to P, wherein said plurality of particles has a mean particle mass between about 5 mg and about 200 mg;
   and wherein said plurality of particles has a standard deviation of mass less than about 30 mg.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A composition comprising a plurality of particles, wherein each particle comprises:
   from about 40% to about 99% by weight of a carrier, wherein said carrier is a water soluble polymer;
   from about 0.0001% to less than 3% by weight of an enzyme, wherein said carrier and said enzyme are substantially homogeneously mixed with one another; and
   from about 0.1% to about 20% by weight of a perfume;
   wherein said plurality of particles has a mean individual particle mass between about 5 mg and about 200 mg; and
   wherein said plurality of particles has a standard deviation of mass less than about 30 mg.

2. The composition according to claim 1, wherein said particle comprises from more than 45% to about 99% by weight of said carrier.

3. The composition according to claim 1, wherein said enzyme is an enzyme particulate.

4. The composition according to claim 3, wherein said carrier is polyethylene glycol, wherein said polyethylene glycol has a weight average molecular weight from about 2000 to about 13000.

5. The composition according to claim 4, wherein said perfume is an encapsulated perfume and is present in each particle in an amount from about 0.1% to about 10% by weight.

6. The composition according to claim 1, wherein said perfume is an encapsulated perfume and is present in each particle in an amount from about 1% to about 15% by weight.

7. A process for forming the composition comprising the plurality of particles according to claim 1 comprising the steps of:
   providing a precursor material;
   providing a distributor having a plurality of apertures;
   passing said precursor material through said apertures;
   providing a moving conveyor beneath said distributor;
   depositing said precursor material onto said moving conveyer; and
   cooling said precursor material to form the plurality of particles;
   wherein said precursor material comprises the water soluble polymer, the enzyme and the perfume; and
   wherein said precursor material is provided at a temperature less than about 70° C.

8. The process according to claim 7, wherein said precursor material comprises polyethylene glycol, wherein said polyethylene glycol has a weight average molecular weight from about 2000 to about 13000.

9. A process for treating laundry articles comprising the steps of:
   providing the composition comprising the plurality of particles according to claim 1 comprising:
   placing a dose of said particles in a dosing cup; and
   dispensing said dose of said particles into a washing machine.

10. The process according to claim 9, wherein said carrier is polyethylene glycol, wherein said polyethylene glycol has a weight average molecular weight from about 2000 to about 13000.

* * * * *